(12) United States Patent
Nonaka (10) Patent No.: US 6,597,962 B2
(45) Date of Patent: Jul. 22, 2003

(54) PRODUCTION PLANNING SYSTEM (75) Inventor: Naomi Nonaka, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/135,510

(22) Filed: May 1, 2002

(65) Prior Publication Data
US 2003/0083765 A1 May 1, 2003

(30) Foreign Application Priority Data
Oct. 30, 2001 (JP) ........................ 2001-332565

(51) Int. Cl.⁷ .................. G06F 19/00; G06F 17/60
(52) U.S. Cl. ................. 700/97; 700/90; 700/95; 705/8
(58) Field of Search ............ 700/90, 95, 97, 700/99, 100, 106; 703/1; 705/7, 8, 28, 29; 29/430

(56) References Cited

U.S. PATENT DOCUMENTS 5,237,495 A * 8/1993 Morii ........................... 705/8
5,971,584 A * 10/1999 Iriuchijima et al. ......... 700/101
5,983,194 A * 11/1999 Hogge et al. ................... 705/7
6,094,603 A * 7/2000 Ishii ............................. 700/97

FOREIGN PATENT DOCUMENTS

JP          6-176030          6/1994

* cited by examiner

Primary Examiner—Jayprakash N. Gandhi
(74) Attorney, Agent, or Firm—McDermott, Will & Emery (57) ABSTRACT A production planning system includes an equipment information data base, a product information data base, a quality historical information data base, an equipment priority calculation section, a line priority calculation section, a production history data base, and a production planning section. The equipment priority calculation section calculates priorities of kinds of equipment based on equipment information from the equipment information data base and product information from the product information data base. The line priority calculation section calculates priorities of production lines based on the product information and yields from the quality historical information data base. The production planning section arranges a production plan based on the priorities of kinds of equipment, the priorities of production lines, a delivery time of products and statuses of the production lines. As a result, a production plan in a production line for a wide variety of products can be arranged easily.

6 Claims, 8 Drawing Sheets

| KINDS OF EQUIPMENT | PRODUCTION LINES | NO. OF UNITS INSTALLED (UNITS) | AVAILABILITY FACTOR (%) |
|---|---|---|---|
| A1 | 1 | 50 | 80 |
| A1 | 2 | 80 | 75 |
| A2 | 1 | 30 | 90 |
| A2 | 2 | 70 | 50 |
| A3 | 1 | 40 | 70 |
| B1 | 1 | 60 | 60 |
| B2 | 1 | 20 | 90 |
| B2 | 2 | 50 | 50 |
| B3 | 1 | 80 | 40 |
| B3 | 2 | 40 | 80 |
| C1 | 1 | 50 | 60 |
| C1 | 2 | 70 | 70 |
| C2 | 1 | 80 | 50 |
| C2 | 2 | 30 | 80 |

FIG.3

| STEPS | PRIORITY 1 EQUIPMENT | CAPACITIES | PRIORITY 2 EQUIPMENT | CAPACITIES |
|---|---|---|---|---|
| STEP a | A1 | 10K/DAY | A3 | 20K/DAY |
| STEP b | B2 | 5K/DAY | B3 | 30K/DAY |
| STEP c | C1 | 10K/DAY | C2 | 15K/DAY |

PRODUCTION PLANNING SYSTEM

BACKGROUND OF THE INVENTION

1. Field of the Invention

The present invention relates to a production planning system.

2. Description of the Background Art

In a case where a wide variety of low volume products are manufactured, plural production lines are run in parallel. Each of the production lines has plural units of equipment to be required for manufacturing products and assignment is made of necessary equipment used for manufacturing on-order products. Since a product is generally manufactured through plural steps, each production line has plural units of equipment installed necessary for manufacturing products in each step and assignment is made of equipment required for manufacturing the products in each step.

Furthermore, differences arise, between production lines, in aspects of equipment used in a line, a process time, a yield, a production capacity and so on and, according to an on-order product, in necessary number of steps for its manufacturing.

In production planning for on-order products using such plural production lines, consideration is given to parameters such as an operational status of each production line (an availability factor), a process time of each production line and a process time of each step.

However, when a trouble occurs in a step of a production line, a great influence of the trouble is exercised on steps subsequent to the troubled step.

Furthermore, when a processing capacity of a production line becomes insufficient or a quality of products in a production line is degraded, a change of production line is required.

Still furthermore, when a change in size of semiconductor wafers fed into a line occurs, a change in equipment used in the line is required.

In such cases, while a production plan is rearranged, there arises a problem of difficulty in arranging an optimal production plan because of complex entanglement associated with plural production lines, a plural steps, plural units of equipment and others.

SUMMARY OF THE INVENTION

It is accordingly an object of the present invention to provide a production planning system capable of arranging a production plan in a production line for a variety of products with ease.

According to the present invention, a production planning system is a system selecting a production line suited for manufacturing on-order products from plural production lines each used for manufacturing a variety of products to arrange a production plan in the selected production line including equipment priority calculation section calculating priorities of kinds of equipment that can be used for manufacturing the on-order products based on equipment information showing a kind of equipment applicable in each of the plural production lines; and product information, including information on a kind of equipment suited for manufacturing the on-order products, and necessary for manufacturing the on-order products; a line priority calculation section calculating priorities of production lines that can be used for manufacturing the on-order products based on quality information on each of a variety of products in each of the plural production lines and the product information; and a production planning section determining a production line suited for manufacturing the on-order products based on the priorities of kinds of equipment calculated in the equipment priority calculation section, the priorities of production lines calculated in the line priority calculation section, the number of the on-order products and statuses of the plural production lines to assign equipment necessary for manufacturing the on-order products and capable of being used to the determined production line and to thereby, arrange a production plan for the on-order products.

Therefore, according to the present invention, since priorities of kinds of equipment in each of production lines and priorities of the production lines are calculated based on information on equipment used, a yield and necessary information for manufacturing on-order products in each of the production lines and a production plan is arranged using a delivery time of the on-order products and a current status of each of the production lines in addition to the priorities of the kinds of equipment and the priorities of the production lines calculated, a production plan for the on-order products can be arranged with ease even if a trouble occurs in the production line and/or a size of semiconductor wafers fed in the production line is changed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Detailed description will be given of embodiments of the present invention with reference to the accompanying drawings. Note that the same or corresponding constituents are attached with the same symbols and no description thereof is repeated.

First Embodiment

Figure 1:
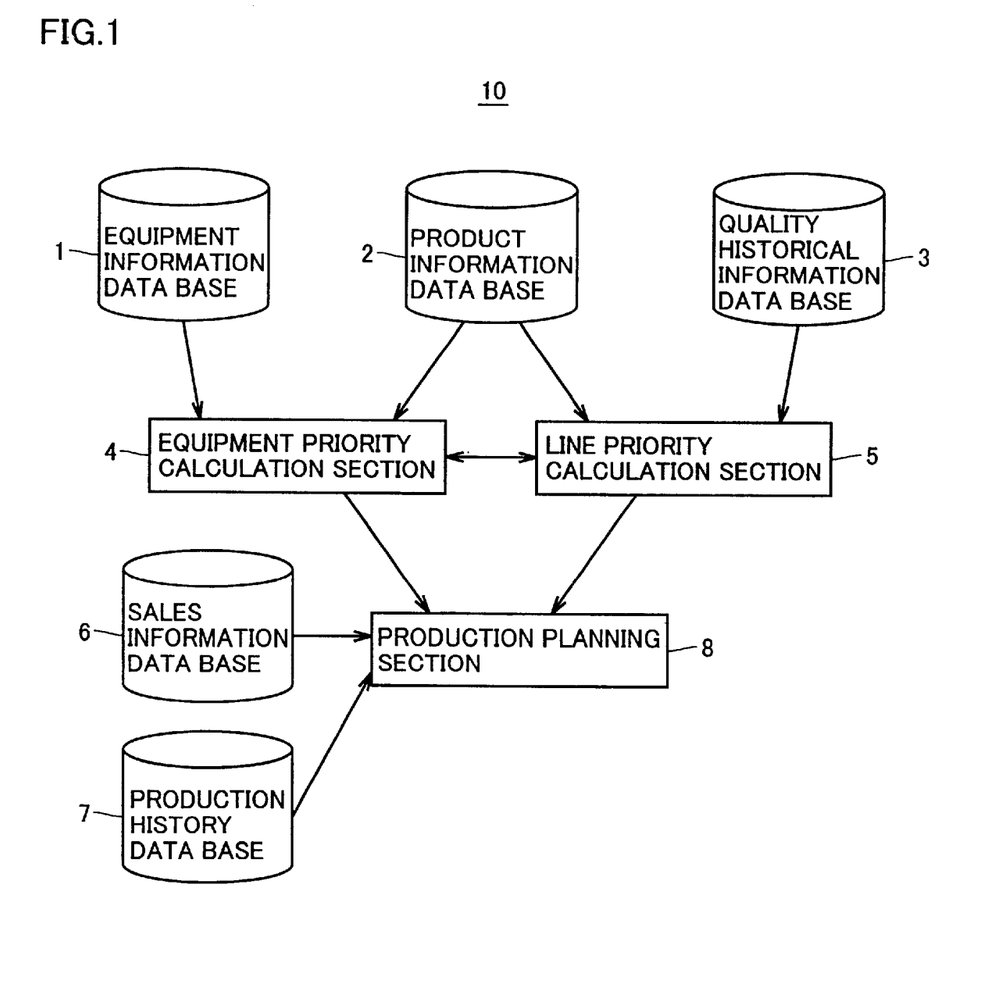
FIG. 1 is a schematic block diagram of a production planning system according to a first embodiment of the present invention.

Referring to FIG. 1, a production planing system 10 according to a first embodiment includes: an equipment information data base 1; a product information data base 2; a quality historical information data base 3; an equipment priority calculation section 4; a line priority calculation section 5i; a sales information data base 6; a production history data base 7; and a production planning section 8.

Equipment information data base 1 holds kinds of equipment, the number of units installed of each kind of equipment and availability factors of kinds of equipment in each of production lines. Product information data base 2 holds information necessary for manufacturing each kind of product. Quality historical information data base 3 holds yields for respective kinds of product in each of the production lines.

Equipment priority calculation section 4 calculates priorities of kinds of equipment necessary for manufacturing on-order products based on equipment information from equipment information data base 1 and product information from product information data base 2. Line priority calculation section 5 calculates priorities of plural production lines suited for manufacturing the on-order products based on product information from product information data base 2 and quality information (a yield) from quality historical information data base 3.

Sales information data base 6 holds the number of on-order products of each kind and the number of on-order products to be manufactured each month. Production history data base 7 holds current statuses of the plural production lines such as which of the plural production lines are in service.

Production planning section 8 determines a production line suited for manufacturing on-order products based on the priorities of kinds of equipment from equipment priority calculation section 4, the priorities of plural production lines from line priority calculation section 5, sales information from sales information data base 6 (the number of on-order products and the number of on-order products to be manufactured in a unit period); and the current statuses of the plural production lines from production history data base 7 to assign necessary kinds of equipment for manufacturing the on-order products to the determined production line and to thereby arrange a production plan for the on-order products.

In FIG. 1, equipment priority calculation section 4 and line priority calculation section 5 are described so as to be adapted to mutual supply/receive data, equipment priority calculation section 4 may calculates priorities of the kinds of equipment with additional consideration to the priorities of production lines calculated by line priority calculation 5, and moreover, line priority calculation section 5 may calculates priorities of the production lines with additional consideration to the priorities of kinds of equipment calculated by equipment priority calculation section 4.

Description will be given of arrangement of a production plan in a case where two production lines are available, products are manufactured through three steps a, b and c.

Figure 2:
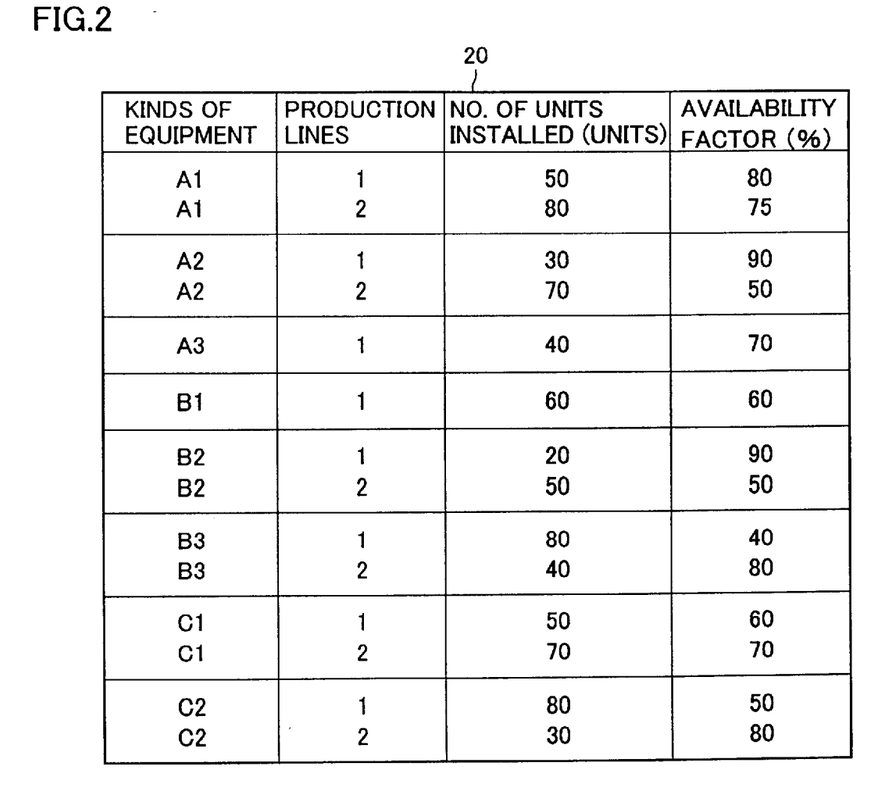
FIG. 2 is an example of equipment information held by an equipment information data base shown in FIG. 1.

FIG. 2 shows equipment information held by equipment information data base 1 shown in FIG. 1. Referring to FIG. 2, equipment information 20 includes kinds of equipment, production lines, the number of units installed of each kind of equipment, and availability factors. As for kinds of equipment, there are available equipment A1 to A3, B1 to B3 and C1 and C2. Equipment A1 to A3 is used in step a, equipment B1 to B3 is used in step b, and equipment C1 and C2 is used in step c.

Equipment A1 can be used in production lines 1 and 2, totaling 130 units. Of the total units, production line 1 has 50 units with an availability factor of 80%. Production line 2 has the rest of 80 units with an availability factor of 75%.

Equipment A2 can also be used in production lines 1 and 2, totaling 100 units. Of the total units, production line 1 has 30 units with an availability factor of 90%. Production line 2 has the rest of 70 units with an availability factor of 50%.

Equipment A3 can be used in production line 1 only and production line 1 has 40 units with an availability factor of 70%.

Equipment B1 to B3 and C1 and C2 each have adaptability to the production lines, singly or in combination, the prescribed numbers of units by line and availability factors by line as shown in the table of FIG. 2.

An availability indicates a ratio of the number of units of each equipment that can be used for manufacturing on-order products to a total unit number thereof in each of the production lines 1 and 2, and means that with a higher availability factor, the number of equipment units that can be assigned to manufacture of products on new order is larger.

Figure 3:
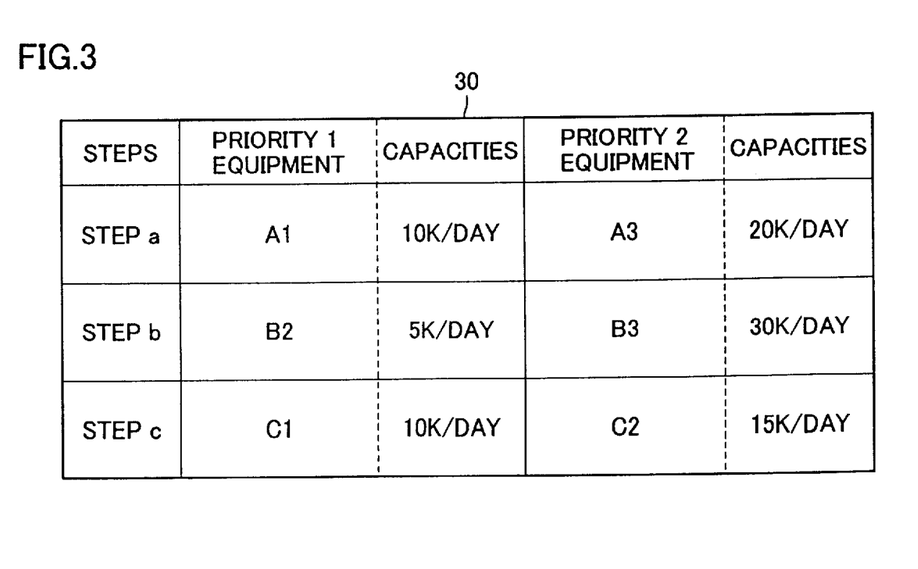
FIG. 3 is an example of product information held by a product information data base shown in FIG. 1.

FIG. 3 shows product information held by product information data base 2 shown in FIG. 1. Referring to FIG. 3, product information 30 includes steps, first priority equipment, second priority equipment and a capacity of first and second priority equipment. The steps are those for on-order products, including steps a, b and c.

In step a, equipment A1 having a per-unit production capacity of 10 K/day is of first priority and equipment A3 having a per-unit production capacity of 20K/day is of second priority. In step b, equipment B2 having a per-unit production capacity of 5 K/day is of first priority and equipment B3 having a per-unit production capacity of 30K/day is of second priority. In step c, equipment C1 having a per-unit production capacity of 10 K/day is of first priority and equipment C2 having a per-unit production capacity of 15K/day is of second priority. Therefore, product information 30 shows information necessary for manufacturing on-order products.

Product information data base 2 holds product information for each product as sown in FIG. 3.

Referring to FIGS. 1 to 3, description will be given of calculation of a priority of equipment by product priority calculation section 4 and calculation of a priority of a production line by line priority calculation section 5. Product priority calculation section 4 reads equipment information 20 from equipment information data base 1 and product information 30 corresponding to on-order products from product information data base 2.

Equipment priority calculation section 4 recognizes that the on-order products are manufactured through three steps a, b and c based on steps of read-out product information 30 to determine priorities of kinds of equipment to be assigned to respective recognized steps a, b and c. Equipment priority calculation section 4 reads that kinds of equipment that can be assigned to step a are equipments A1 and A3 from equipment information 20 and further reads that priorities of kinds of equipment suited for manufacturing the on-order products are in the order of equipment A1 and equipment A3, together with per-unit capacities of equipments A1 and A3 from product information 30. Equipment priority calculation section 4 reads production lines to which equipments A1 to A3 are applicable, and the numbers of units installed and availability factors of equipments A1 to A3 in each of the production lines from equipment information 20 and excludes equipment A2 from the kinds of equipment to be assigned to step a since equipment A2 is neither of equipment with first and second priorities read-out from product information 30. Thereafter, equipment priority calculation section 4 compares a product of the number of units installed and an availability factor of equipment A1 in each of the production lines with a product of the number of units installed and an availability factor of equipment A3 in a corresponding one of the production lines. In this case, there are obtained, as for equipment A1, the product of 400 (in production line 1) and the product of 600 (in production line 2), and as for equipment A3, the product of 560 (in production line 1). As a result, equipment priority calculation section 4 gives first priority to equipment A1 larger in product and second priority to equipment A3.

Then, equipment priority calculation section 4 determines priorities of kinds of equipment to be assigned to step b. Equipment priority calculation section 4 reads that kinds of equipment that can be assigned to step b are equipments B1 to B3 from equipment information 20, and that priorities of kinds of equipment suited for manufacturing the on-order products are in the order of equipment B2 and equipment B3, together with capabilities of the kinds of equipment from product information 30. Equipment priority calculation section 4 reads production lines to which equipments B1 to B3 are applicable, and the numbers of units installed and availability factors of equipments B1 to B3 in each of the production lines from equipment information 20 and excludes equipment B1 from kinds of equipment to be assigned to step b since equipment B1 is neither of equipment with first and second priorities read-out from product information 30. Thereafter, equipment priority calculation section 4 compares a product of the number of units installed and an availability factor of equipment A2 in each of the production lines with the number of units installed and an availability factor of equipment B3 in a corresponding one of the production lines. In this case, there are obtained, as for equipment B2, the product of 90 (in production line 1) and the product of 50 (in production line 2), and as for equipment B3, the product of 960 (in production lines 1 and 2). As a result, equipment priority calculation section 4 gives first priority to equipment B3 larger in product and second priority to equipment B2.

Furthermore, equipment priority calculation section 4 determines priorities of kinds of equipment to be assigned to step c. Equipment priority calculation section 4 reads that kinds of equipment that can be assigned to step c are equipments C1 and C2 from equipment information 20, and that priorities of the kinds of equipment suited for manufacturing the on-order products are in the order of equipment C1 and equipment C2, together with capabilities of the kinds of equipment from product information 30. Equipment priority calculation section 4 reads production lines to which equipments C1 and C2 are applicable, and the numbers of units installed and availability factors of equipments C1 and C2 in each of the production lines from equipment information 20 and compares a product of the number of units installed and an availability factor of equipment C1 in each of the production lines with a product of the number of units installed and an availability factor of equipment C2 in a corresponding one of the production lines. In this case, there are obtained, as for equipment C1, the product of 300 (in production line 1) and the product of 490 (in production line 2), and as for equipment C2, the product of 600 (in production line 1) and the product of 360 (in production line 2). As a result, equipment priority calculation section 4 gives first priority to equipment C2 larger in product and second priority to equipment C1.

In such a way, equipment priority calculation section 4 calculates priorities of kinds of equipment assigned to each step for on-order products based on equipment information and product information.

Line priority calculation section 5 calculates priorities of production lines suited for manufacturing on-order product based on product information 30 read out from product information data base 2 and yields in product lines 1 and 2 read out from quality historical information data base 3. Note that a yield in production line 1 is set to 80% and a yield in production line 2 is set to 90%.

Since a quantity of products manufactured through steps a, b and c are limited by a production capacity of a step with the lowest production capacity, line priority calculation section 5 extracts a minimum production capacity of 5 k/day when first priority equipment is assigned to three steps a, b and c and a minimum production capacity of 15 k/day when second priority equipment is assigned to three steps a, b and c from product information 30 to calculate products of each of the extracted minimum production capacities and each of the yields of the production lines and to determine priorities of the production lines in the descending order of product. In this case, when first priority equipment is assigned to steps a, b and c, products each of a minimum production capacity and each of the yields are 4 (in production line 1) and 4.5 (in production line 2), and when second priority equipment is assigned to steps a, b and c, a product of the minimum production capacity and the yield is 12 (in production line 1). The reason why when second priority equipment is assigned to steps a, b and c, a product in production line 2 is not shown is that equipment A3 can be assigned to production line 1 only.

As a result, line priority calculation section 5 gives first priority to production line 1 larger in product and second priority to production line 2.

In such a way, line priority calculation section 5 calculates priorities of production lines suited for manufacturing on-order products based on product information and quality information (yield).

Production planning section 8 receives equipment priorities from equipment priority calculation section 4, production line priorities from line priority calculation section 5, the number and a delivery time of on-order products of each kind from sales information data base 6 and current statuses of production lines from production history data base 7. In detail, production planning section 8 receives the following information from equipment priority calculation section 4: equipment A1 has first priority and equipment A3 has second priority in step a; equipment B3 has first priority and equipment B2 has second priority in step b; and equipment C2 has first priority and equipment C1 has second priority in step c. Furthermore, production planning section 8 receives production line 1 with first priority and production line 2 with second priority from line priority calculation section 5, 100 k for April and 200 k for May as delivery times from sales information data base 6 and information that production line 1 can be used but production line 2 cannot be used from production history data base 7.

Figure 4:
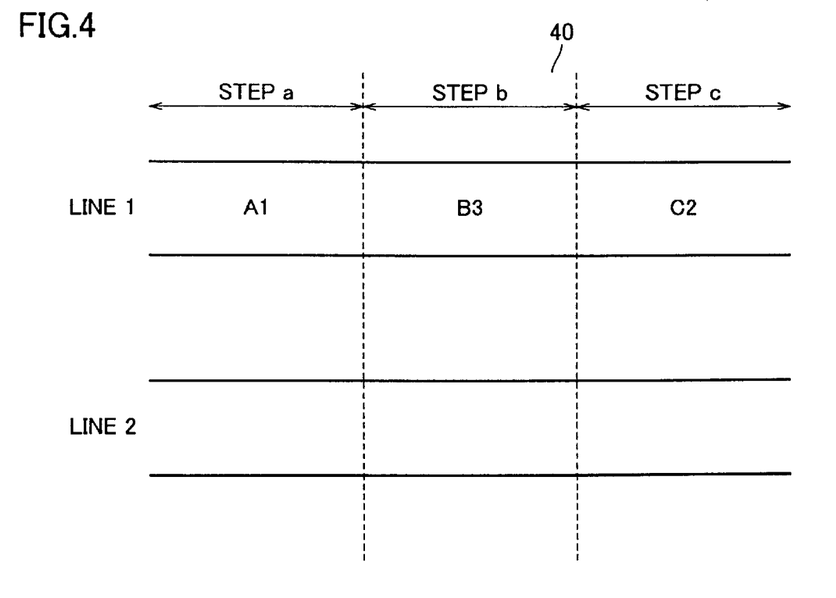
FIG. 4 is an example of production plan arranged by the production planning system shown in FIG. 1.
Figure 5:
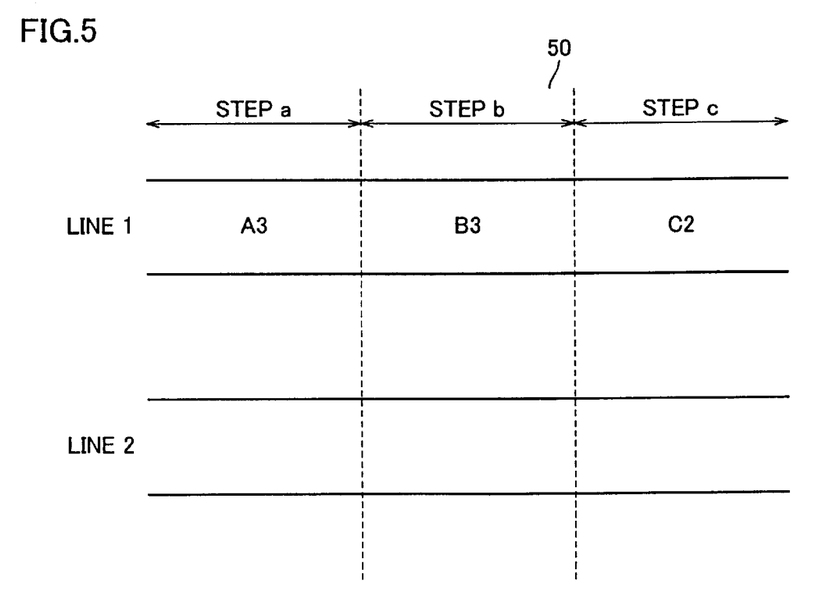
FIG. 5 is another example of production plan arranged by the production planning system shown in FIG. 1.

With such information received, production planning section 8 determines that a production line suited for on-order products is production line 1, based on priorities of production lines and current statuses of the production lines. Furthermore, production planning section 8 assigns equipment to steps a, b and c based on priorities of equipment and a delivery time to arrange a production plan for the on-order products. In detail, production planning section 8 arranges production plan 40 for April shown in FIG. 4 and production plan 50 shown in FIG. 5. In this case, production planning section 8 takes into consideration that deliveries are 100 k in April and 200 k in May, and assigns equipment A1 to step a, equipment B3 to step b and equipment C2 to step c in production plan 40. Furthermore, production planning section 8 assigns equipment A3 to step a, equipment B3 to step b and equipment C2 to step c in production plan 50. Since the number of products doubles in a delivery time of May, equipment A3 with a production capacity twice that of equipment A1 is assigned to step a.

With such a procedure applied, a production plan meeting delivery times of April and May can be arranged.

Figure 6:
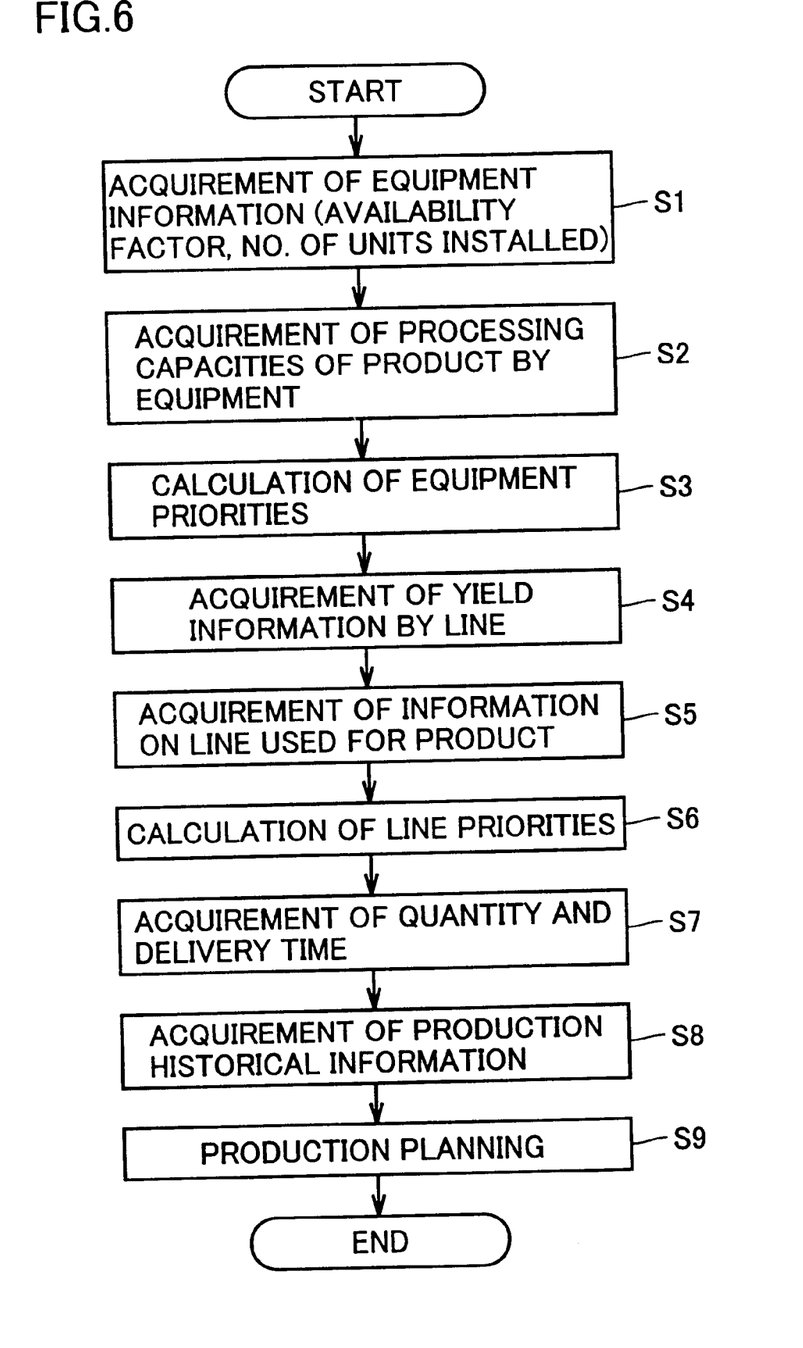
FIG. 6 is a flow chart for describing an arrangement operation for a production plan in the first embodiment.

Referring to FIG. 6, description will be given of operation for arranging a production plan in production planning system 10. Upon the start of operation, equipment priority calculation section 4 acquires equipment information 30 from equipment information data base 1 (step S1), and reads product information 30 from product information data base 2 to acquire per-unit processing capacities of respective kinds of equipment (step S2). Furthermore, equipment priority calculation section 4 calculates priorities of equipment as described above based on equipment information 20 and product information 30 to output the priorities of equipment calculated to production planning section 8 (step S3).

Thereafter, line priority calculation section 5 acquires yields of respective production lines from quality historical information data base 3 (step S4), reads out product information 30 from product information data base 2 and acquires information on a production line that is to be used for manufacturing the on-order products (step S5). Product information 30 shown in FIG. 3 shows kinds of equipment suited for manufacturing the on-order products, and by detecting equipment A1, A3, B2, B3, C1 and C2 included in product information 30, production lines 1 and 2 having equipments A1, A3, B2, B3, C1 and C2 can be found. Accordingly, line priority calculation section 5 can acquire information on a production line that is to be used for manufacturing the on-order products based on product information 30.

Line priority calculation section 5 calculates priorities of production lines as described above based on yield information of each of the production lines and product information 30 to output the priorities of respective production lines calculated to production planning section 8 (step S6). Then, production planning section 8 acquires a quantity of the on-order products and a delivery time from sales information data base 6 (step S7) and acquires current statuses of the respective production lines as production history data from production historical data base 7 (step S8). Then, production planning section 8 arranges production plans 40 and 50 for the on-order products based on the equipment priorities, the production line priorities, the delivery time and the current statuses of the production lines (step S9), thereby ending a series of operations.

In the above description, while equipment priority calculation section 4 and line priority calculation section 5 are handled on the assumption that neither of supply and reception of data is performed therebetween, mutual supply/reception of data is allowed between equipment priority calculation section 4 and line priority calculation section 5 in the present invention as described above. In this case, equipment priority calculation section 4 calculates priorities of equipment with additional consideration to the priorities of production lines calculated by line priority calculation section 5. To be concrete, since line priority calculation section 5 outputs results of calculation which production line 1 has first priority and production line 2 has second priority, equipment priority calculation section 4 calculates priorities of equipment assigned to step a as priority of equipment A3 is first priority and priority of equipment A1 is second priority. In this case, equipment priority calculation section 4 calculates priorities of equipment concerning steps b and c, similar to the way as described above.

Furthermore, line priority calculation section 5 calculates priorities of production lines with additional consideration to the priorities of equipment calculated by equipment priority calculation section 4. To be concrete, since equipment priority calculation section 4 outputs results of calculation which priority of equipment A3 is first priority and priority of equipment A3 is second priority in step a, priority of equipment B3 is first priority and priority of equipment B2 is second priority in step. b, and priority of equipment C2 is first priority and priority of equipment C1 is second priority in step c, line priority calculation section 5 may give first priority to any of the production lines 1 and 2. This is because in this case, equipments A1, B3 and C2 each with first priority in all three steps a, b and c are equipment applicable to both of the production lines.

In a case where equipment priority calculation section 4 and line priority calculation section 5 perform supply/reception of data therebetween to arrange a production plan, an operation from steps S1 to S3 and an operation from steps S4 to S6 of the flow chart shown in FIG. 6 are performed in parallel to each other, and a result of calculation in step S3 is reflected in calculation of priorities of the production lines in step S6, while a result of calculation in step S6 is reflected in calculation of priorities of equipment in step S3.

Figure 7:
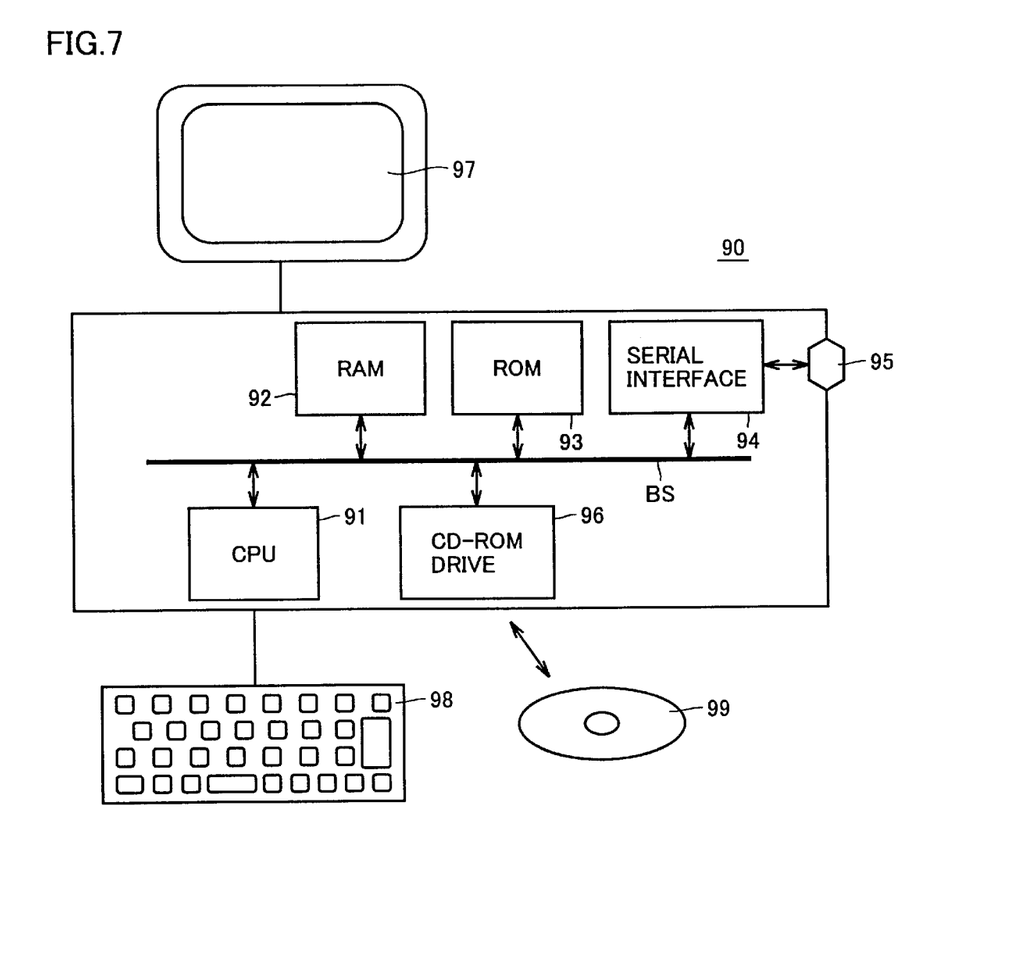
FIG. 7 is a schematic block diagram of a personal computer executing a program including the flow chart shown in FIG. 6.

Arrangement of a production plan in production planing system 10 shown in FIG. 1 can be performed using a personal computer. Referring to FIG. 7, a personal computer 90 includes a data bus BS, CPU (Central Processing Unit) 91, RAM (Random Access Memory) 92, ROM (Read Only Memory) 93, a serial interface 94, a terminal 95, a CD-ROM drive 96, a display 97, and a key board 98.

CPU 91 reads a program stored in ROM 93 through data bus BS to arrange the above production plan using the read-out program. Furthermore, CPU 91 stores a program acquired through serial interface 94, terminal 95 and an internet network or a program read out from CD (Compact Disk) 99 through CD-ROM drive 96 into ROM 93. Moreover, CPU 91 not only receives an instruction from a user inputted from key board 98, but also presents production plans 40 and 50 arranged by the program on display 97.

RAM 92 is a work memory in which a production plan is arranged by CPU 91 using the program executing steps of a flow chart shown in FIG. 6. ROM 93 stores a program arranging a production plan, equipment information, product information, quality historical information, sales information and production historical information therein. Serial interface 94 performs supply/reception of data between data bus BS and terminal 95.

Terminal 95 is a terminal for connecting personal computer 90 to a modem (not shown) with a cable. CD-ROM drive 96 reads a program stored in CD 99. Display 97 gives a user various kinds of information as visual information. Key board 98 inputs an instruction from the user.

In a case where a production plan for on-order products is arranged by a user with personal computer 90 run on the program, CPU 91 reads the program from ROM 93 through data bus BS. Then, CPU 91 executes the read-out program to read equipment information, product information and quality historical information stored in ROM 93 and to calculate priorities of equipment and priorities of production lines in each of three steps a, b and c. Then, CPU 91 arranges a production plan based on the calculated priorities of equipment and production lines, sales information and production historical information read out from ROM 93. Then, CPU 91 presents the arranged production plan on display 97.

Note that when new equipment information, new product information, new quality historical information, new sales information and new production historical information are inputted through key board 98, CPU 91 stores the inputted information such as the equipment information and the others, into ROM 93 through data bus BS.

A user connects personal computer 90 to a modem (not shown) through terminal 95 and can thereby acquire a program for arranging a production plan through the internet. Then CPU 91 stores the acquired program, through terminal 95, serial interface 94 and data bus BS into ROM 93. Alternatively, the user inserts CD 99 into CD-ROM drive 96 and causes the program stored in CD 99 to be read into personal computer 96. CPU 91 acquires the program that CD-ROM drive 96 reads through data bus BS to store the program into ROM 93. Moreover, CPU 91 reads the program stored in ROM 93 through data bus BS according to an instruction from the user to arrange a production plan.

In such a way, personal computer 90 can acquire a program arranging a production plan, by means of various methods. Therefore, in the present invention, a program for arranging a production plan includes programs acquired by means of the above various methods. Second Embodiment Referring to FIG. 8, a production planning system 10A according to a second embodiment is of a construction including the construction of production planning system 10, and a quality information change section 9 and an equipment information change section 11 as additional constituents, wherein the construction of production planning system 10 is unchanged.

Figure 9:
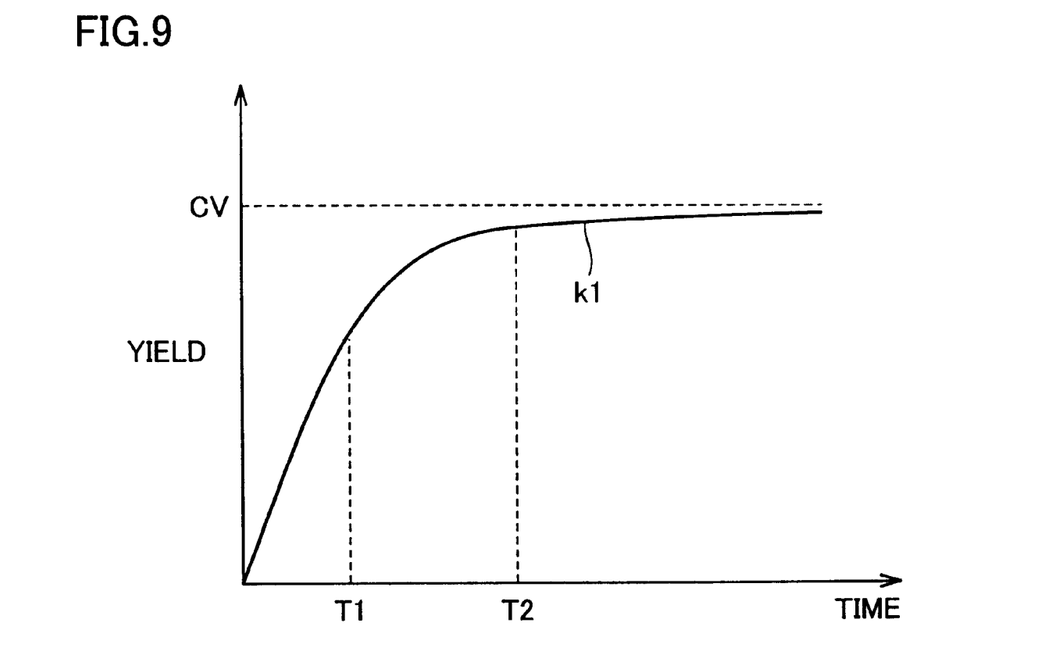
FIG. 9 is a graph showing a change in yield over time.

When yields in production lines 1 and 2 change, quality information change section 9 outputs a new yield after the change to line priority calculation section 5. A yield of a production line generally changes with passage of time after the start-up of the production line as depicted with a curve k1 shown in FIG. 9 and approaches a constant value CV at the final stage. Therefore, when a production plan is arranged at timings T1 and T2, quality information change section 9 outputs yields different from the constant value CV to line priority calculation section 5. When a yield is inputted from quality information change section 9, line priority calculation section 5 uses the yield inputted from quality information change section 9 instead of a yield read out from quality historical information data base 3 to calculate a priority of a production line and to output the calculated priority to production planning section 8.

Figure 8:
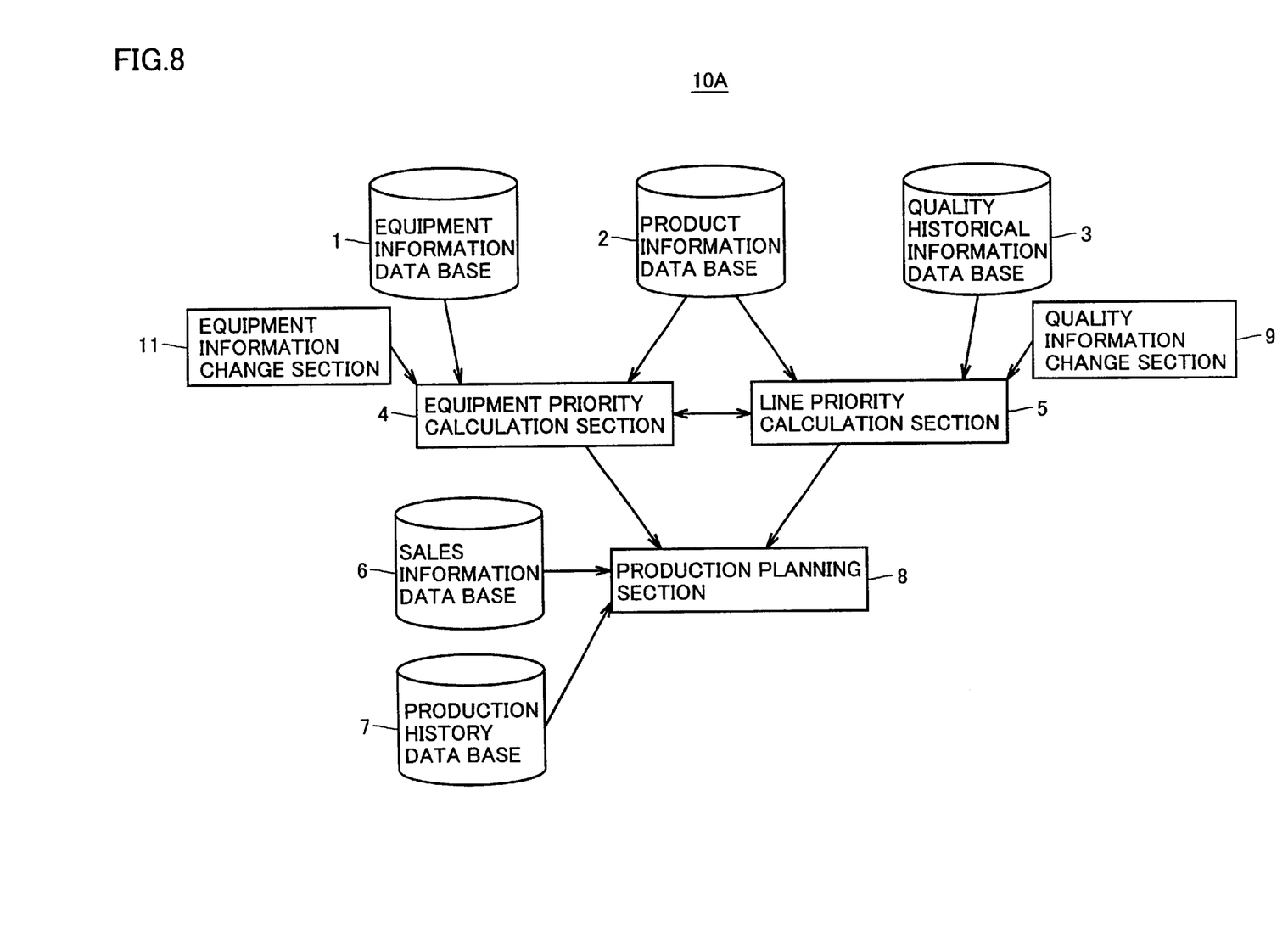
FIG. 8 is a schematic block diagram of a production planning system according to a second embodiment of the present invention.

When there arises a change in size of semiconductor wafers used in production lines 1 and 2, for example, equipment information change section 11 outputs a name of equipment suited for a wafer size after the change, and the number of units installed and availability factors of the equipment in each of the production lines 1 and 2 to equipment priority calculation section 4. Furthermore, when there arise changes in the number of units installed of each of kinds of equipment and the availability factors of kinds of equipment as well, equipment information change section 11 outputs the number of units installed and availability factors of each of kinds of equipment after the changes to equipment priority calculation section 4.

When the changed equipment information is inputted from equipment information change section 11, equipment priority calculation section 4 calculates priorities of equipment based on equipment information inputted from equipment information change section 11 instead of equipment information read-out from equipment information data base 1 to output the calculated priorities of equipment to production planning section 8.

Figure 10:
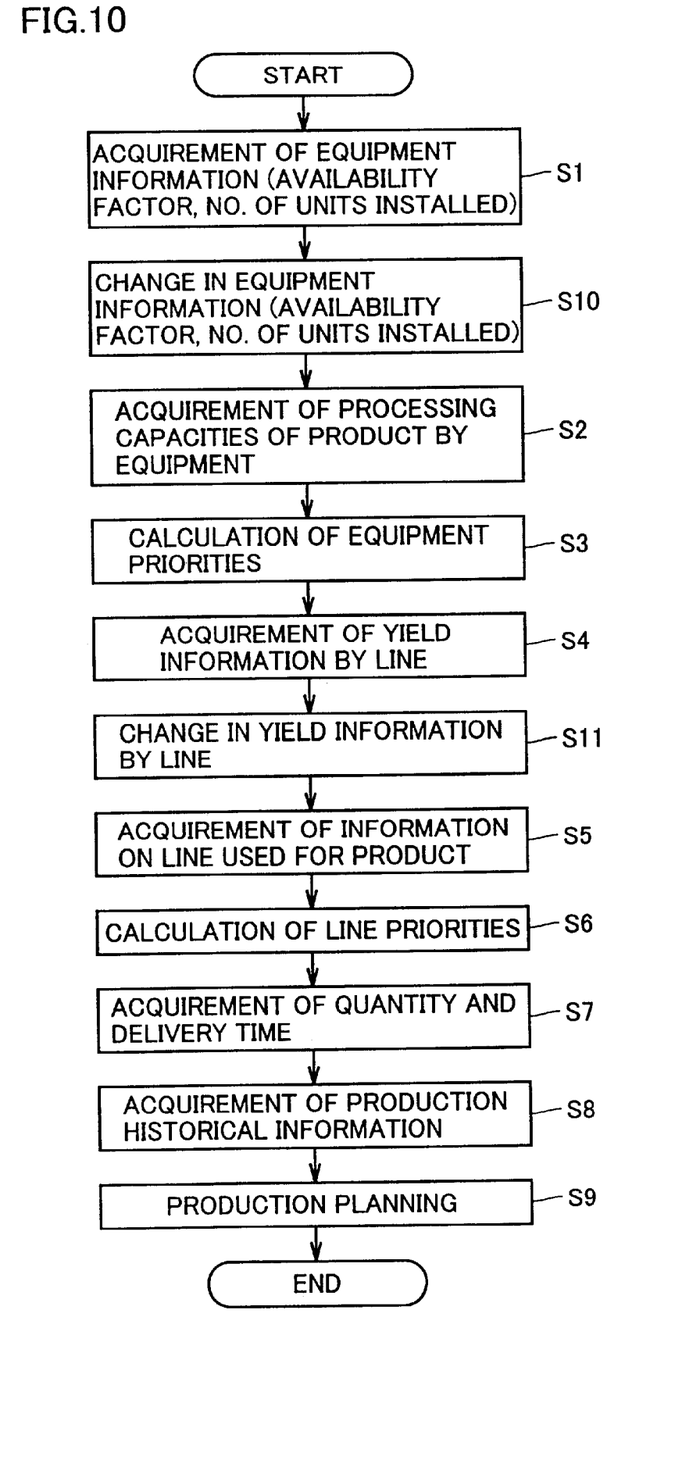
FIG. 10 is a flow chart for describing an arrangement operation for a production plan in the second embodiment.

FIG. 10 is a flow chart for describing an arrangement operation for a production plan in production planing system 10A. The flow chart shown in FIG. 10 is constructed by adding steps S10 and S11 to the flow chart shown in FIG. 6, wherein the flow chart shown in FIG. 6 is unchanged.

After step S1, equipment information change section 11 outputs equipment information after the change as described above (step S10) and equipment priority calculation section 4, in step S3, calculates priorities of equipment based on the changed equipment information as described in the first embodiment.

Furthermore, after step S4, quality information change section 9 outputs yields after the change to line priority calculation section 5 (step S11) and line priority calculation section 5, in step S6, calculates priorities of production lines based on the changed yields of production lines as described in the first embodiment.

Thereafter, finally in step S9, a production plan is arranged in which the changed equipment information and the changed yields are reflected.

The other construction and operations are the same as those of the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A production planning system selecting a production line suited for manufacturing on-order products from plural production lines each used for manufacturing a variety of products to arrange a production plan in the selected production line comprising:

an equipment priority calculation section calculating priorities of kinds of equipment that can be used for manufacturing said on-order products based on equipment information showing a kind of equipment applicable in each of said plural production lines; and product information, including information on a kind of equipment suited for manufacturing said on-order products, and necessary for manufacturing said on-order products;

a line priority calculation section calculating priorities of production lines that can be used for manufacturing said on-order products based on quality information on each of a variety of products in each of said plural production lines and said product information; and a production planning section determining a production line suited for manufacturing said on-order products based on said priorities of kinds of equipment calculated in said equipment priority calculation section, said priorities of production lines calculated in said line priority calculation section, the number of said on-order products and statuses of said plural production lines to assign equipment necessary for manufacturing said on-order products and capable of being used to the determined production line and to thereby arrange a production plan for said on-order products.

2. The production planning system according to claim 1, wherein said line priority calculation section calculates priorities of said production lines with additional consideration to said priorities of kinds of equipment calculated in said equipment priority calculation section.

3. The production planning system according to claim 1, wherein said equipment priority calculation section calculates priorities of said kinds of equipment with additional consideration to said priorities of production lines calculated in said line priority calculation section.

4. The production planning system according to claim 1, wherein said line priority calculation section calculates priorities of said production lines by referring to said quality information with a priority over said product information.

5. The production planning system according to claim 1, wherein said on-order products are manufactured through plural steps, said equipment priority calculation section calculates priorities of said kinds of equipment in each of said plural steps, said line priority calculation section calculates priorities of said production lines in each of said plural steps and said production planning section assigns equipment necessary for manufacturing said on-order products and capable of being used to each of said plural steps in said determined production line.

6. The production planning system according to claim 1, further comprising:

an equipment information change section changing said equipment information; and a quality information change section changing said quality information, wherein said equipment priority calculation section calculates priories of said kinds of equipment with additional consideration to a result of the change in said equipment information obtained by said equipment information change section and said line priority calculation section calculates priorities of said production lines with additional consideration to a result of the change in said quality information obtained by said quality information change section.

* * * * *